United States Patent [19]
Wilson et al.

[11] Patent Number: 4,835,247
[45] Date of Patent: May 30, 1989

[54] PROCESS FOR THE SYNTHESIS OF A COPOLYESTER ADHESIVE RESIN

[75] Inventors: John R. Wilson, Hartville; Marian M. Rousek, Akron; Fred L. Massey, Uniontown, all of Ohio

[73] Assignee: The Goodyear Tire & Rubber Company, Akron, Ohio

[21] Appl. No.: 229,688

[22] Filed: Aug. 8, 1988

[51] Int. Cl.$^4$ ............................................. C08G 63/04
[52] U.S. Cl. .................................... 528/272; 528/274; 528/279; 528/285; 528/302; 528/304; 528/308; 528/308.1
[58] Field of Search ............... 528/272, 274, 279, 285, 528/302, 304, 308, 308.1

[56] References Cited

U.S. PATENT DOCUMENTS

| | | | |
|---|---|---|---|
| 2,965,613 | 12/1960 | Milone et al. | |
| 4,186,227 | 1/1980 | Nulff et al. | 427/388 |
| 4,254,243 | 3/1981 | Keck | 525/444 |
| 4,418,188 | 11/1983 | Smith et al. | 528/274 |
| 4,424,337 | 1/1984 | Smith et al. | 528/274 |
| 4,447,595 | 5/1984 | Smith et al. | 528/274 |
| 4,520,188 | 5/1985 | Holzrichter et al. | 528/274 |

*Primary Examiner*—John Kight
*Assistant Examiner*—Samuel A. Acquah
*Attorney, Agent, or Firm*—Alvin T. Rockhill

[57] ABSTRACT

Isophthalic acid is commonly utilized as a comonomer in the preparation of copolyester resins which are utilized as solution adhesives. Unfortunately, solutions of such resins frequently become hazy due to the presence of cyclic oligomers. This invention is based upon the unexpected discovery that the presence of protonic acids during the synthesis of the copolyester resins containing isophthalic acid utilizing conventional metallic catalysts results in solutions of the resins in organic solvents being virtually haze free. The subject invention more specifically reveals a process for synthesizing a polyethylene terephthalate/isophthalate/azelate copolyester resin which is particularly useful as a solution adhesive resin, comprising reacting ethylene glycol with a diacid component which is comprised of (a) from about 25 to about 45 mole percent terephthalic acid, (b) from about 10 to about 30 to about 55 mole percent azelaic acid based upon the diacid component; in the presence of at least one metallic catalyst selected from the group consisting of antimony compounds, titanium compounds; manganese compounds, and germanium compounds and in the presence of at least one protonic acid having a pKa of less than about 2.5; wherein the amount of metallic catalyst present is within the rang eof about 130 ppm to about 1500 ppm and wherein the amount of protonic acid present is within the range of about 50 ppm to about 500 ppm, with said amounts being based upon the weight of the copolyester resin produced.

22 Claims, No Drawings

PROCESS FOR THE SYNTHESIS OF A COPOLYESTER ADHESIVE RESIN

BACKGROUND OF THE INVENTION

Solution or lacquer adhesives are utilized in a wide variety of applications. Such adhesives are particularly useful because they can be easily applied to a substrate.

Solution adhesives are bonding compositions which achieve a solid state and resultant strength through evaporation or removal of solvent. This is in contrast to hot melt adhesives which achieve a solid state and resultant strength by cooling from an elevated temperature. In other words, the application of heat melts the hot melt adhesive and after the heat source is removed, it solidifies simply by cooling. Hot melt adhesives are widely used in industrial applications because they can be used to form strong bonds very quickly. However, the difficulty associated with applying hot melt adhesives at an elevated temperature has greatly limited their usage in many applications.

Solution adhesives offer an advantage over hot melt adhesives in that heating is not required in their application to a substrate. Solution adhesives are widely utilized in general purpose and household applications because of their ease of application. Solution adhesives are also the adhesive of choice in a wide variety of industrial applications, such as those where the application of a hot melt adhesive would be difficult or impractical.

Copolyester resins are frequently utilized in solution adhesive compositions. Such solution adhesive compositions are simply prepared by dissolving the copolyester resin in a suitable organic solvent. It is highly desirable for the organic solvent to have a low boiling point. This results in faster rates of solvent evaporation and consequently reduces the time required for bonding. The copolyester resins utilized in solution adhesives commonly contain repeat units which are derived from isophthalic acid. For example, polyethylene terephthalate/isophthalate/azelate copolyesters are widely utilized as solution adhesive resins. Unfortunately, solutions of such copolyester resins form visible haze on standing. Haze formation in such solutions is, of course, highly undesirable because it renders the solution adhesive composition unsuitable for use in many applications.

The haze which forms in such solution adhesives is due to the presence of cyclic oligomers, such as the cyclic dimer of ethylene azelate, the cyclic dimer of ethylene isophthalate, the cyclic monomer of ethylene azelate, and the cyclic trimer of ethylene terephthalate. The cyclic dimer of ethylene isophthalate is believed to be the predominant cyclic oligomer in such solutions. It is the result of the cyclization of ethylene glycol and isophthalic acid to form the following ring structure:

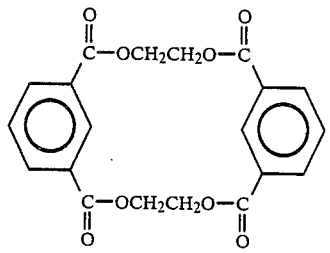

This ring structure contains two units of ethylene isophthalate (hence, the name cyclic dimer) and is a by-product of the polyesterification reaction of ethylene glycol with isophthalic acid or of the transesterification reaction of ethylene glycol with isophthalate esters such as dimethyl- or diethylisophthalate.

Cyclic dimer is produced as an unwanted reaction by-product in conventional synthesis techniques for preparing copolyester resins which contain repeat units which are derived from isophthalic acid. In such conventional synthesis techniques, the cyclic dimer is believed to be formed during the esterification stage of the reaction. This is because cyclic dimer is the esterification product of two isophthalic acid molecules with two ethylene glycol molecules.

SUMMARY OF THE INVENTION

This invention overcomes the problem of haze formation in solution adhesive formulations which contain copolyester resins having repeat units which are derived from isophthalic acid. It is based upon the unexpected finding that the presence of protonic acids during the synthesis of isophthalic acid containing copolyesters results in solutions of the copolyesters in organic solvents being essentially haze free. Accordingly, the process of this invention can be utilized in the synthesis of isophthalic acid containing copolyesters which do not form haze in solutions with organic solvents. The presence of protonic acids during the synthesis of such copolyesters may inhibit the formation of cyclic oligomers or may improve the solubility of such cyclic oligomers in organic solvents or a combination of both of these.

The subject invention more specifically reveals in a process for the synthesis of polyester resins having repeat units which are derived from isophthalic acid by reacting at least one dicarboxylic acid or diester thereof with at least one diol in the presence of at least one metallic catalyst, wherein one of the dicarboxylic acids is isophthalic acid: the improvement which comprises conducting the reaction in the presence of 50 ppm to 500 ppm of at least one protonic acid having a pKa of less than about 2.5, wherein the amounts of protonic acid present are based upon the weight of the polyester resin produced.

The present invention also discloses a process for synthesizing a polyethylene terephthalate/isophthalate/azelate copolyester resin which is particularly useful as a solution adhesive resin, comprising reacting ethylene glycol with a diacid component which is comprised of (a) from about 25 to about 45 mole percent terephthalic acid, (b) from about 10 to about 30 mole percent isophthalic acid, and (c) from about 30 to about 55 mole percent azelaic acid based upon the diacid component; in the presence of at least one metallic catalyst selected from the group consisting of antimony compounds, titanium compounds; manganese compounds, and germanium compounds and in the presence of at least one protonic acid having a pKa of less than about 2.5; wherein the amount of metallic catalyst present is within the range of about 130 ppm to about 1500 ppm and wherein the amount of protonic acid present is within the range of about 50 ppm to about 500 ppm, with said amounts being based upon the weight of the copolyester resin produced.

DETAILED DESCRIPTION OF THE INVENTION

The process of this invention can be utilized in the preparation of polyester resins which contain repeat units which are derived from isophthalic acid or a diester thereof, such as dimethyl isophthalate or diethyl isophthalate. Such polyesters will typically contain at least about 2 mole percent repeat units which are derived from isophthalic acid or a diester thereof, based upon the total diacid component in the polyester. Such polyesters will more typically contain at least about 5 mole percent repeat units which are derived from isophthalic acid or a diester thereof.

The copolyesters of this invention are prepared by reacting a diacid component with a diol component. Isophthalic acid or a diester thereof is, of course, one of the diacids in the diacid component. The term "diacid component" as used herein is therefore intended to include diesters of diacids. A wide variety of diacids can be utilized in conjunction with isophthalic acid in the diacid component. For example, both aromatic and aliphatic dicarboxylic acids can be utilized in the diacid component with isophthalic acid. Phthalic acid, terephthalic acid, 2,6-napthalene dicarboxylic acid, and 1,6-napthalene dicarboxylic acid are some representative examples of aromatic dicarboxylic acids which can be utilized in the diacid component with isophthalic acid. The aliphatic dicarboxylic acids which can be used in the diacid component will normally contain from about 4 to about 12 carbon atoms. Some representative examples of suitable aliphatic dicarboxylic acids include 1,4-butane dicarboxylic acid, 1,5-pentane dicarboxylic acid, 1,6-hexane dicarboxylic acid, 1,7-heptane dicarboxylic acid (azelaic acid), 1,8-octane dicarboxylic acid, 1,9-nonane dicarboxylic acid, 1,10-decane dicarboxylic acid, 1,11-undecane dicarboxylic acid, and 1,12-dodecane dicarboxylic acid. The diacid component utilized in preparing copolyester resins for solution adhesives will typically contain from about 25 mole percent to about 45 mole percent terephthalic acid, from about 10 mole percent to about 30 mole percent isophthalic acid, and from about 30 mole percent to about 55 mole percent azelaic acid. Such resins for solution adhesives will preferably contain from about 30 mole percent to about 40 mole percent terephthalic acid, from about 15 mole percent to about 25 mole percent isophthalic acid, and from about 40 mole percent to about 52 mole percent azelaic acid.

A wide variety of diols can be utilized in the diol component of the polyesters of this invention. The diol utilized in the polyesters of this invention will typically be aliphatic diols containing from 2 to about 8 carbon atoms. Some representative examples of diols which can be utilized in the diol component include ethylene glycol, 1,3-propane diol, 1,4-butane diol, and neopentyl glycol. Ethylene glycol is highly preferred for utilization in preparing copolyester resins for solution adhesives due to its generally lower cost.

The copolyesters of this invention are synthesized in the presence of at least one protonic acid as a cyclic dimer inhibitor. However, in all other respects, the polyesters of this invention are synthesized utilizing conventional polymerization techniques which are well known to those skilled in the art. In other words, the polyesters are synthesized in the presence of a protonic acid utilizing polymerization techniques which are in other respects conventional. Thus, conventional temperatures, catalysts, amounts of catalysts, stabilizers and the like, are used in manners well known in the literature and art.

These polyesters will normally be prepared utilizing a two step process which consists of an esterification stage and a condensation stage. In the first step of the process, the esterification stage, the diacid component is esterified with the diol component. This step is typically carried out at a temperature which is within the range of about 150° C. to about 240° C. under an inert atmosphere which is maintained at atmospheric pressure. The inert gas utilized in the esterification stage is generally nitrogen or a noble gas with nitrogen being preferred for economic reasons. The esterification stage of the reaction can be carried out in the presence of appropriate catalysts, such as titanium alkoxides, tin alkoxides, tetraalkyl titanium compounds, manganese trifluoroacetic acid, manganese acetate, lead acetate, or zinc acetates. In cases where the diacid component is a diester, a catalyst will normally be utilized in order to attain satisfactory reaction rates. During the esterification stage of the reaction, both esterification and polycondensation reactions occur simultaneously. However, during the esterification stage, the esterification reaction will be predominant with condensation reactions occurring to a lesser extent.

The second step in the preparation of such polyesters is the condensation step. During this stage of the reaction, polycondensation reactions occur with the molecular weight and intrinsic viscosity of the polyester continuously increasing. The condensation stage of the reaction is carried out under a reduced pressure and at an increased temperature to attain faster rates of polymerization. For instance, the pressure utilized in the condensation stage is typically less than about 25 mm of mercury ($2.7 \times 10^3$ Pascals) and preferably less than about 5 mm of mercury ($6.7 \times 10^2$ Pascals) It is most preferred to utilize a reduced pressure of less than about 0.5 mm of mercury (66.7 Pascals). It is important to attain high vacuums when resins having high intrinsic viscosities are being synthesized. The temperature utilized in the esterification stage is typically within the range of about 230° C. to about 300° C. The polymerization time required will vary with the amount and type of catalyst used as well as the polymerization temperature and vacuum utilized. The extent of the polycondensation will also depend somewhat on the desired molecular weight or intrinsic viscosity of the polyester resin being synthesized.

The copolyesters of this invention which are utilized as solution adhesive resins will generally have relatively high intrinsic viscosities. For instance, such polyesters will normally have intrinsic viscosities of at least about 0.5 dl/g. These copolyester resins will more preferably have intrinsic viscosities which are within the range of about 0.6 dl/g to about 1.0 dl/g. It is most preferred for polyester resins which are utilized as solution adhesives to have intrinsic viscosities which are within the range of about 0.75 to about 0.95 dl/g. The intrinsic viscosity of such polyester resins are typically measured in a 60:40 phenol:tetrachloroethane solvent system at a temperature of 30° C. and at a concentration of 0.4 g/dl.

The process of this invention utilizes a protonic acid in the synthesis of copolyesters which can be dissolved in organic solvents to make essentially haze free solutions. The protonic acids which can be utilized typically have a pKa of less than about 2.5 and preferably less than about 2.0. Some representative examples of suitable protonic acids include sulfuric acid, phosphoric acid, sulphurous acid, trichloroacetic acid, dichloroacetic acid, para-toluene sulfonic acid, meta-toluene sulfonic acid and the like. Organic acids, such as sulfonic acids, are generally preferred. Para-toluene sulfonic acid is a highly preferred protonic acid. It is highly preferred because its utilization leads to less processing difficulties during the synthesis of the copolyester.

The protonic acid will typically be utilized in the smallest concentration which will inhibit the formation of cyclic dimer. This is typically within the range of about 50 ppm to about 500 ppm. It is generally preferred to utilize a concentration of protonic acid which is within the range of about 75 ppm to about 200 ppm. It is typically most preferred to utilize a concentration of protonic acid which is within the range of about 100 ppm to about 150 ppm. These concentrations which are expressed in ppm (parts per million) are calculated based upon the weight of the polyester resin produced. The polymerizations of this invention will typically be conducted in the presence of about 130 ppm to about 1500 ppm of at least one metallic catalyst. It is generally preferred for the amount of metallic catalyst present to be within the range of about 160 ppm to about 1000 ppm with an amount which is within the range of about 200 ppm to about 400 ppm being most preferred.

Solution adhesives of the copolyesters of the present invention can be prepared by simply dissolving the copolyester in an appropriate organic solvent. Such solvents will have a relatively low boiling point and will be capable of dissolving a relatively large amount of the polyester resin per unit volume. Carbon tetrachloride, chloroform, tetrachloroethane, methyl ethyl ketone and tetrahydrofuran have suitable properties for utilization as solvents in such adhesive compositions. Methyl ethyl ketone and tetrahydrofuran are particularly preferred for utilization as solvents in such solution adhesive compositions. Such solution adhesives can contain up to about 40 weight percent copolyester resin, based upon the total weight of the solution. It is generally preferred for such solution adhesive compositions to contain from about 15 weight percent to about 35 weight percent copolyester resin, based upon the total weight of the solution adhesive composition. Such solutions of the polyester resins of this invention are essentially haze free.

Antidegradants, colorants, fillers and/or other desired agents can be added to the solution adhesives of this invention. The solution adhesive can then be utilized in a conventional manner such as by applying it to a substrate and transferring the substrate to a surface to which it is to be adhered. Upon evaporation of the solvent, bonding of the two surfaces results. Such solution adhesives are useful for adhering metal, plastics, natural and synthetic fabrics, paper, leather, cardboard and glass.

In order to more fully illustrate the nature of this invention and the manner of practicing the same, the following examples are presented. Unless specifically indicated otherwise, all parts and percentages are given by weight.

EXAMPLE 1

In this experiment a copolyester resin which could be utilized in preparing haze-free solution adhesives was prepared in a 15 lbs. (6.8 kg) reactor. In the procedure utilized, the reactor oil temperature was set at 220° C. for the initial monomer charge. In the monomer charge, there was a molar ratio of ethylene glycol to diacids of 1.2:1. The initial charge contained 4.4 lbs. (2 kg) of ethylene glycol, 1519.6 grams of terephthalic acid, 893.8 grams of isophthalic acid, 2326.9 grams of azelaic acid, and 1.09 grams of a premixed solution containing para-toluene sulfonic acid and antimony trioxide. The diacid component utilized in this polymerization contained 34 mole percent terephthalic acid, 20 mole percent isophthalic acid, and 46 mole percent azelaic acid. The initial charge also contained 200 ppm of para-toluene sulfonic acid and 1,000 ppm of antimony trioxide.

After about 30 minutes, the reactor oil temperature was increased to 260° C. A column head temperature of about 145° C. and a pressure of about 35 psig ($3.4 \times 10^5$ Pascals) was maintained. When the column head temperature reduced to about 110° C. due to reduced generation of water as an esterification reaction by-product, the contents of the reactor were transferred to the second stage. The theoretical yield of water as a reaction by-product was 869 ml.

The initial reactor oil temperature for the second stage reactor was 235° C. A vacuum was applied with a full vacuum of less than 1 mm of Hg (133 Pascals) ultimately being attained. The reactor oil temperature was also increased to 245° C. This condensation stage of the reaction was continued until an intrinsic viscosity for the copolyester resin being produced of about 0.85 d/g was attained.

The copolyester prepared was dissolved in methyl ethyl ketone. The solution formed remained haze free for a period of over 2 weeks. It should be noted that even though some copolyester solutions containing cyclic dimer are initially haze free, that haze typically forms after a few days. However, this technique was successful in producing a copolyester resin which remained haze free in solution for long periods of time. The solution prepared was also determined to have an excellent combination of properties for utilization as an adhesive. Such solution adhesives are particularly useful in food packaging applications, such as multilayer laminates for food packaging and retort pouches. They are also useful for affixing solar films to glass.

EXAMPLE 2

(COMPARATIVE)

This experiment was conducted utilizing the same procedure described in Example 1 except that para-toluene sulfonic acid was not included in the polymerization recipe. In this experiment, the copolyester resin produced was also dissolved in methyl ethyl ketone to make a solution adhesive. However, haze formed in the solution after a few days. Thus, this comparative experiment clearly shows that the presence of para-toluene sulfonic acid resulted in the formation of a resin which could be utilized in making a haze free solution in methyl ethyl ketone.

EXAMPLE 3

This experiment was conducted utilizing the same procedure as is described in Example 1 except that only 400 ppm of antimony trioxide was utilized in the polymerization. Solutions of the copolyester made in methyl ethyl ketone had good clarity and remained haze free for over two weeks. The color of the resin made in this experiment was deemed to be better than the color of the resin produced in Example 1. The resin made also had an excellent combination of properties for utilization in making solution adhesives.

While certain representative embodiments and details have been shown for the purpose of illustrating this invention, it will be apparent to those skilled in this art that various changes and modifications can be made therein without departing from the scope of the present invention.

What is claimed is:

1. In a process for the synthesis of polyester resins having repeat units which are derived from isophthalic acid by reacting at least one dicarboxylic acid or diester thereof with at least one diol in the presence of at least one metallic catalyst, wherein one of the dicarboxylic acids is isophthalic acid; the improvement which comprises conducting the reaction in the presence of 50 ppm to 500 ppm of at least one protonic acid having a pKa of less than about 2.5, wherein the amounts of protonic acid present are based upon the weight of the polyester resin produced.

2. A process for synthesizing a polyethylene terephthalate/isophthalate/azelate copolyester resin which is particularly useful as a solution adhesive resin, comprising reacting ethylene glycol with a diacid component which is comprised of (a) from about 25 to about 45 mole percent terephthalic acid, (b) from about 10 to about 30 mole percent isophthalic acid, and (c) from about 30 to about 55 mole percent azelaic acid based upon the diacid component: in the presence of at least one metallic catalyst selected from the group consisting of antimony compounds, titanium compounds: manganese compounds, and germanium compounds and in the presence of at least one protonic acid having a pKa of less than about 2.5; wherein the amount of metallic catalyst present is within the range of about 130 ppm to about 1500 ppm and wherein the amount of protonic acid present is within the range of about 50 ppm to about 500 ppm, with said amounts being based upon the weight of the copolyester resin produced.

3. A process as specified in claim 1 wherein the pKa of the protonic acid is less than about 2.0.

4. A process as specified in claim 1 wherein the protonic acid is para-toluene sulfonic acid.

5. A process as specified in claim 1 wherein from about 75 ppm to about 200 ppm of the protonic acid catalyst is present.

6. A process as specified in claim 1 wherein from about 100 to about 150 ppm of the protonic acid catalyst is present.

7. A process as specified in claim 5 wherein the protonic acid is para-toluene sulfonic acid.

8. A process as specified in claim 6 wherein the protonic acid is para-toluene sulfonic acid.

9. A process as specified in claim 8 wherein the metallic catalyst is an antimony compound.

10. A process as specified in claim 9 wherein the antimony compound is antimony trioxide.

11. A process as specified in claim 2 wherein the protonic acid has a pKa of less than about 2.0.

12. A process as specified in claim 2 wherein the protonic acid is present at a level which is within the range of about 75 ppm to about 200 ppm.

13. A process as specified in claim 12 wherein the diacid component is comprised of from about 30 to about mole percent terephthalic acid, from about 15 to about 25 mole percent isophthalic acid, and from about to about 52 mole percent azelaic acid.

14. A process as specified in claim 13 wherein the metallic catalyst is an antimony compound.

15. A process as specified in claim 14 wherein the protonic acid is para-toluene sulfonic acid.

16. A process as specified in claim 15 wherein the amount of protonic acid present is within the range of about 100 ppm to about 150 ppm.

17. A process as specified in claim 16 wherein the antimony compound is antimony trioxide.

18. A process as specified in claim 17 wherein the amount of antimony trioxide present is about 1,000 ppm.

19. A process as specified in claim 16 wherein the reaction is continued until the copolyester resin being produced has an intrinsic viscosity which is within the range of about 0.6 dl/g to about 1.0 dl/g.

20. A process as specified in claim 18 wherein the reaction is continued until a copolyester resin having an intrinsic viscosity which is within the range of about 0.75 dl/g to about 0.9 dl/g is produced.

21. A copolyester resin made by the process specific in claim 2.

22. A solution adhesive made by dissolving the copolyester resin made by the process specified in claim 2 in an organic solvent.

* * * * *